United States Patent [19]

Fanberg

[11] 4,102,247
[45] Jul. 25, 1978

[54] DEPTH KEY SET

[76] Inventor: Victor Vincent Fanberg, 5221 Mt. Ariane Ter., San Diego, Calif. 92111

[21] Appl. No.: 729,347

[22] Filed: Oct. 4, 1976

[51] Int. Cl.² .......................................... B23Q 35/42
[52] U.S. Cl. .................................. 90/62 R; 76/110; 90/13.05
[58] Field of Search ............... 76/110; 90/62 R, 13.05

[56] References Cited

U.S. PATENT DOCUMENTS 3,791,240  2/1974  Meoni ..................................... 76/110
3,810,416  5/1974  Nelms, Jr. ............................. 90/62 R Primary Examiner—Frank T. Yost
Attorney, Agent, or Firm—Brown & Martin

[57] ABSTRACT

The depth key set for a given key type includes a pair of depth keys for each desired cut depth. The first key in each pair is utilized in making cuts at the odd numbered cut positions and the second key in each pair is utilized in making cuts at the even numbered positions. The depth key set may be utilized in association with a standard key cutting machine and provides guidance for the cutter in making both the forward and rearward slopes of each cut.

3 Claims, 5 Drawing Figures

DEPTH KEY SET

BACKGROUND OF THE INVENTION

A standard depth key set utilized by a locksmith in association with a basic key cutting machine only guides the cutter with respect to the longitudinal position along the key blank for the selected cut. The rearward facing slope of each cut, that is the slope of the cut facing toward the bow of the key is made by the cutter shape itself. However, the cutter is not shaped to make a forward or tip facing slope. The forward face of the cutter is arranged at right angles to the longitudinal axis of the key. Thus a key, after cutting on the key machine, will include a series of cuts with one sloped and one perpendicular face. The locksmith must then use a hand file to produce a slope on the rear face of each cut. This slope must be made cautiously to avoid destroying the base of an adjacent cut or to cutting of the shoulder of the key blank. If the perpendicular faces are not filed to the proper slope the key will not operate the tumblers in the lock and therefore cannot be inserted properly into the lock. On the other hand, if the cuts extend too far and destroy the base of an adjacent cut the tumbler for that cut will not be stopped at the proper position and the lock will not operate. Should the filing destroy the key shoulder, then the key can be inserted too far into the lock and again will not operate the lock properly.

Micrometer cutters are available to custom cut each cut in the key to precisely correct depth and shape. However, such cutters are awkward to use especially in the field and are expensive to obtain and operate.

The deficiencies of conventional depth key sets are particularly apparent when it is desired to produce a set of master keys for a particular key type. Master keys and master key sets are frequently required by a locksmith operating in the field. Such key sets may, for example, be necessary so that a locksmith can carry all of the keys necessary to operate the locks of a particular foreign vehicle, so that he can answer a call where such a vehicle has been locked with the key inside. A similar requirement exists to have a master key for an apartment hotel building which will operate the door lock in all of the rooms in the apartment hotel while at the same time none of the individual door keys will operate any of the other door locks. Such master keys and key sets conventionally produced with special depth key sets utilize base depth that are precisely half-way between standard depths. For example, for a particular key blank a number six cut depth may have a blank base to cut base depth of 0.230 inches whereas a number five depth cut will have a depth of 0.260 inches. A master key with a cut depth of 0.245 inches (half-way between the number and number six cut depth) will operate locks set for either five or six depth.

It will be understood that a master key half cut between the depth at each cut position will operate a number of keys equal to 2 raised to a power corresponding to the number of pin tumbler positions. Accordingly, for a 5 pin tumbler lock with 5 cut positions along the longitudinal axis of the key will operate 25 or 32 locks.

The tolerance of locks for accepting keys with off specification depths is limited and it will therefore be apparent that precise control over the cut depth is required. For this reason it is very difficult to manufacture a half cut depth key set that will operate in conjunction with a conventional basic key cutting machine and produce repeatable results in developing master keys.

Accordingly, it is desirable to have a depth key set that may be utilized in conjunction with a basic key cutting machine to standard and master keys with precisely made cuts. Such a depth key set is particularly desirable where it provides guidance for the cutter on both slopes of a cut without interfering with an adjacent cut base or with the key shoulder.

SUMMARY OF THE INVENTION

In an exemplary embodiment of the invention, the depth key set for a given key type includes a pair of depth keys for each desired cut depth. For purposes of the exemplary embodiment, it will be assumed that the key type is for locks having five pin tumblers and accordingly five cut positions are longitudinally spaced along the key. The first cut position is adjacent the key shoulder and the last or fifth cut is adjacent the key tip. With reference for example, to the depth key pair utilized in making number five depth cuts, the first key in the pair has cuts to the standard number five depth at the cut positions corresponding to the first, third and fifth positions. The cuts thus spaced are complete. That is, they extend from the surface of the key sloping downwardly to the standard cut depth. Even the keys for the maximum cut depth such as the number eight cut depth have sloping sides extending over most of the entire original height of the key blank.

When it is desired to make a number five cut at the first cut position, the first key in the depth key pair is chucked into the key cutting machine opposite the guide. The guide then traces out the slope of both the forward facing and the rear facing slopes of the cut making a fully guided corresponding cut in the key blank adjacent the cutter. It will be noted that such a cut requires little or no filing and therefore there is no danger that the shoulder will be filed off while making a forward facing cut slope. Similarly, if the second cut is to be at the number eight depth, then the key pair for the number eight depth is selected, and the second key in the pair utilized for its cut at the number two longitudinal cut position. The key again then provides guidance over the entire depth of the key blank for the guide and therefore the cutter. Thus, even though the number eight cut is deeper than the previous number five cut there is no danger of cutting into the base of the number five cut when the forward facing slope is made. The remainder of the cuts proceed in the same fashion with the locksmith alternating between the first and second keys in the pair and the depth keys being chucked into the key cutting machine and utilized to guide the cutter.

When making the master keys, a master half-cut depth key set is utilized. In such a depth key set, the depth of the depth keys is between the standard depth cuts. The first pair, for example, are cut to a depth half-way between the standard number one and number two depths. Thus by selecting the appropriate key pair, the locksmith may make half-cut depth cuts at any selected longitudinal position, and thereby produce a master key which will operate 32 locks. Proceeding in a well known fashion the locksmith then makes master keys which between them can operate all of the locks for a particular lock type.

The practice of the invention permits a locksmith with a basic key cutting machine to perform many of the functions previously available only to those with micrometer key cutting machines. The use of the invention is particularly important in making master key sets in that precise control over the depth of cuts and the integrity of each cut is more important than in conventional keys. However the invention also has application in making conventional keys, and in such application is advantageous over the present methods in that the cutter is guided in making both the forward facing and rearward facing slopes of the cut, which reduces or eliminates the need for filing, and reduces the incidence of destroyed key blanks where the shoulder or other essential structural feature of the key blank is destroyed in the key cutting process.

Other objects and attendant advantages of the invention will become more apparent upon a reading of the following detailed description together with the drawings in which like reference numerals refer to like parts throughout and in which:

DETAILED DESCRIPTION OF THE PREFERRED EMBODIMENT

Figure 1:
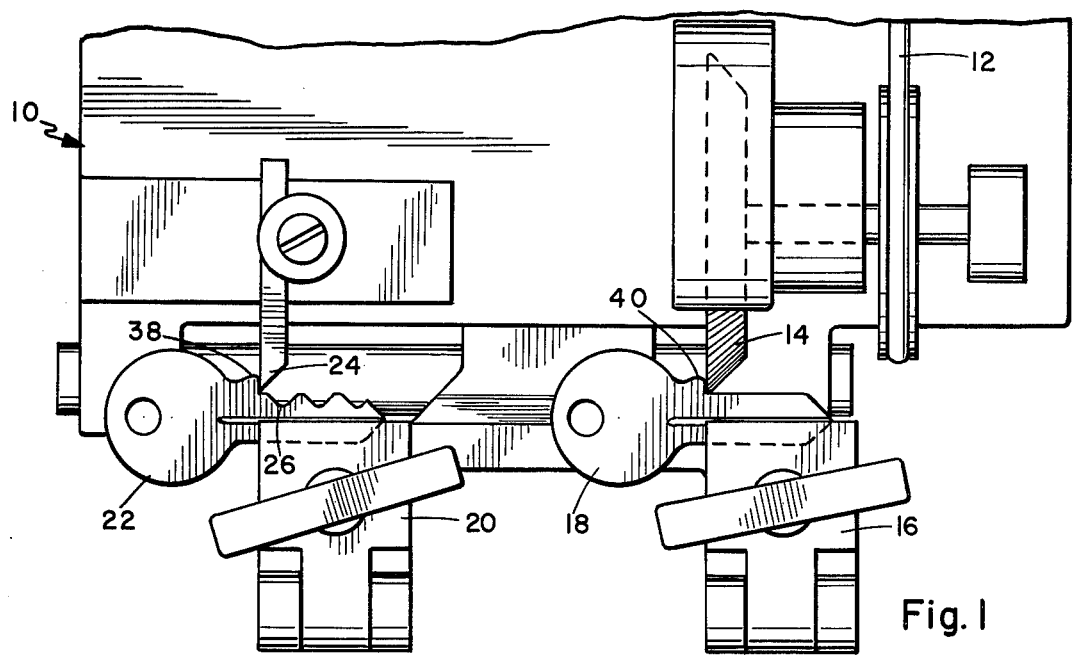
FIG. 1 is a top plan view of a portion of a typical basic key cutting machine with a depth key and blank key in place.
Figure 2:
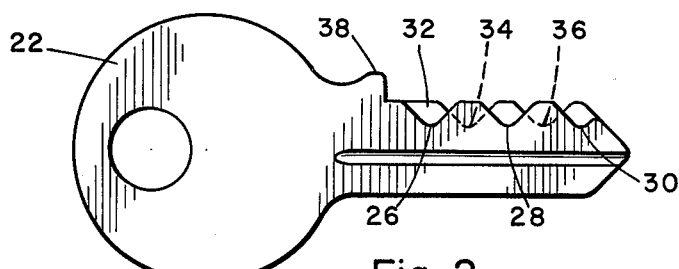
FIG. 2 shows a pair of depth keys superimposed.

Referring now to FIG. 1, there is illustrated a basic key cutting machine 10 driven by a motor (not shown) through a belt 12 which rotates the cutter 14. A first chuck 16 holds a key blank 18 in position opposite the cutter 14 and a second chuck 20 holds a depth key 22 opposite the guide 24. It will be understood that according to conventional practice the guides are mounted for simultaneous movement toward and away from the cutter 14 and guide 24, and for longitudinal movement past the key and key blank.

The depth key 22 is the depth key for making cuts at the odd numbered positions, that is, the depth key 22 makes depths corresponding to the cuts in the depth key at 26, 28 and 30. The cut 26 is at a longitudinal position corresponding to the first cut and cut 30 is at the longitudinal position for the fifth cut. For clarity the depth key 22 is shown superimposed on a depth key 32 which is the second key in the pair for the depth illustrated. Key 32 has cuts (shown in dotted line) 34 and 36. Cut 34 corresponds to the second longitudinal cut position and cut 36 corresponds to the fourth longitudinal position. Whereas depth keys for only the number five depth are illustrated, it will be understood that in the complete depth key set, a pair of keys will be provided for each cut depth desired. In making conventional keys, this would frequently involve having a pair of depth keys for depths one through eight. On the other hand, in making a master key set, depth keys at the half cut depth would be provided at one and one-half through seven and one-half depths.

OPERATION

In the practice of the invention, the locksmith would select a depth key corresponding to the desired cut depth for the first cut position. The depth key is aligned and chucked into the chuck 20 opposite the guide 24. Blank 18 is chucked into the chuck 16 in the same relative position. It will be noted that the guide 24 buts against the shoulder 38 on depth key 22 and the cutter 14 buts against the shoulder 40 on blank 18. The operator then turns on the motor and biases the carriage toward the guide and cutter as the carriage is moved to the left. The cutter follows the outline of the first depth cut 26 and traces an identical cut in the first cut position on blank 18.

Figure 3:
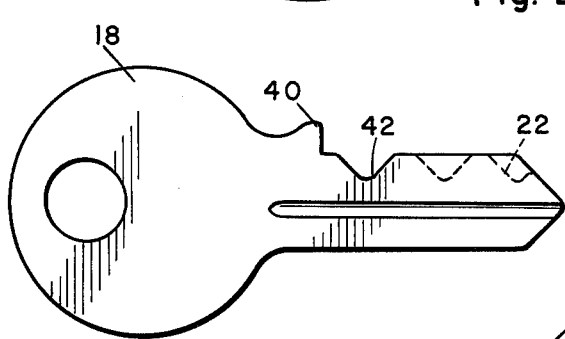
FIG. 3 shows a first position, odd numbered position depth key with a key blank having the first position cut superimposed.
Figure 4:
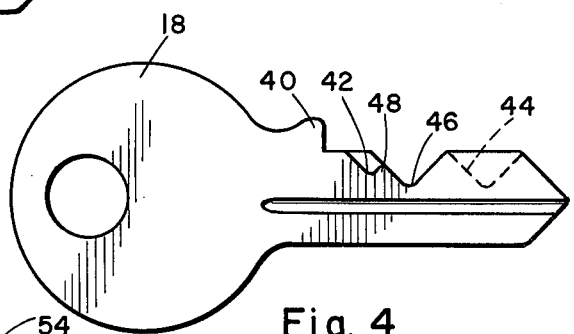
FIG. 4 shows an even numbered position depth key with a key blank having the second position cut superimposed.

The results of the above described process are illustrated in FIG. 3. The blank 18 is illustrated with a cut 42 which matches the outline of the cut 26 on the superimposed depth key 22. Thus a number five depth cut has been made in the key blank at the first position. This cut has cut slopes on both the forward and rearward slopes of the cut. In making the second cut, it for purposes of illustration is assumed that the key calls for a number eight depth cut to be made at the second longitudinal cut position. Thus the second or even number key for number eight depths is selected, the outline for such a depth key is illustrated at 44 in FIG. 4. It will be apparent that by properly chucking the depth key 44 into the key cutting machine and tracing out the cut in the master key (at the second position) a cut 46 will be made in the key blank. It will be noted that the cutter is guided throughout the cutting process and there is no possibility that the base of the previous cut 42 will be cut off or that the peak 48 between the two cuts will be leveled.

Figure 5:
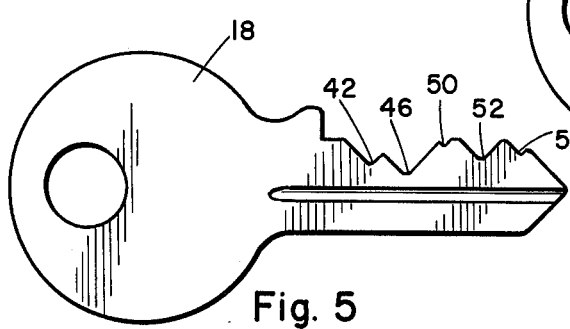
FIG. 5 shows a key blank with cuts made by depth keys at each of the five longitudinal cut positions.

The process proceeds in the same manner for making cuts at the third, fourth and fifth positions with the locksmith selecting the appropriate depth and then the appropriate one of the depth key pair for that depth. Assuming cuts are to be made corresponding to the number one depth, the number four depth and the number two depth, a finished key corresponding to that illustrated in FIG. 5 will be produced, with successive cuts 42, 46, 50, 52 and 54. Regardless of the cut depth, the base of each adjacent cut will be maintained intact and the peaks between the cuts maintained. Additionally the slopes for each of the cuts will be produced in such a manner to produce a good action when the key is inserted into the lock and the tumblers ride over the cut faces.

Having described my invention, I now claim:

1. A set of master keys comprising:
   a pair of keys for each desired cut depth,
   a first key in each of said pairs having cuts at the odd numbered longitudinal cut positions,
   and a second key in each of said pairs having cuts at even numbered cut positions.

2. The set of master keys according to claim 1 wherein:
   each of said cuts in said master keys comprise forward sloping and rearward slopes.

3. A set of master keys according to claim 1 characterized by the cut depths for the depth keys being halfway between standard depth cuts.

* * * * *